(12) United States Patent
Woodell

(10) Patent No.: US 6,388,607 B1
(45) Date of Patent: May 14, 2002

(54) MULTI-SWEEP METHOD AND SYSTEM FOR MAPPING TERRAIN WITH A WEATHER RADAR SYSTEM

(75) Inventor: Daniel L. Woodell, Tobins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 19 days.

(21) Appl. No.: 09/667,442

(22) Filed: Sep. 22, 2000

(51) Int. Cl.$^7$ ................................. G01S 13/95
(52) U.S. Cl. ................ 342/26; 342/75; 342/158; 342/159
(58) Field of Search ................ 342/26, 74, 75, 342/76, 77, 78, 79, 80, 158, 159, 160, 161, 162, 163, 164, 175, 192, 193, 194, 195, 196, 197

(56) References Cited

U.S. PATENT DOCUMENTS

| | | | |
|---|---|---|---|
| 3,781,878 A | * 12/1973 | Kirkpatrick | 342/26 |
| 3,885,237 A | * 5/1975 | Kirkpatrick | 342/26 |
| 5,920,276 A | * 7/1999 | Frederick | 342/26 |
| 6,154,169 A | * 11/2000 | Kuntman | 342/74 |
| 6,184,816 B1 | * 2/2001 | Zheng et al. | 342/26 |
| 6,201,494 B1 | * 3/2001 | Kronfeld | 342/26 |
| 6,236,351 B1 | * 5/2001 | Conner et al. | 342/26 |

OTHER PUBLICATIONS

Co–pending patent application Docket No. 00CR092/KE entitled "Method and System For Suppressing Ground Clutter Returns On An Airborne Weather Radar" filed on an even date, inventor D. Woodell.

Co–pending patent application Docket No. 00CR093/KE entitled "Multi–Sweep Method And System For Detecting And Displaying Weather Information On A Weather Radar System" filed on an even date, inventor D. Woodell.

Co–pending patent application Docket No. 00CR028/KE entitled "Method And System For Detecting Turbulence With Reduced Errors Resulting From Vertical Shear Components" filed on an even date, inventor D. Woodell.

* cited by examiner

Primary Examiner—John B. Sotomayor
(74) Attorney, Agent, or Firm—Nathan O. Jensen; Kyle Eppele

(57) ABSTRACT

A system and method for detecting, processing, and displaying ground mapping radar information which uses multiple scans, at differing automated antenna tilt angles, to generate a single displayed image. This can be used to increase the scanned area of a ground display so as to allow a complete sampling of the ground ahead of the aircraft.

25 Claims, 1 Drawing Sheet

MULTI-SWEEP METHOD AND SYSTEM FOR MAPPING TERRAIN WITH A WEATHER RADAR SYSTEM

CROSS REFERENCE TO RELATED APPLICATIONS

This application relates to an application entitled "METHOD AND SYSTEM FOR DETECTING TURBULENCE WITH REDUCED ERRORS RESULTING FROM VERTICAL SHEAR COMPONENTS", U.S. application Ser. No. 09/668715, by Daniel L. Woodell, Roy Robertson, and Ying C. Lai, and also relates to another application entitled "METHOD AND SYSTEM FOR SUPPRESSING GROUND CLUTTER RETURNS ON AN AIRBORNE WEATHER RADAR", U.S. application Ser. No. 09/668656 by Daniel L. Woodell, and further relates to an application entitled "MULTI-SWEEP METHOD AND SYSTEM FOR DETECTING AND DISPLAYING WEATHER INFORMATION ON A WEATHER RADAR SYSTEM", U.S. application Ser. No. 09/668674 by Daniel L. Woodell, all filed on even date herewith and assigned to a common assignee, which applications are incorporated herein in their entirety by this reference.

FIELD OF THE INVENTION

The present invention generally relates to radars, and more particularly relates to weather radars, and even more particularly relates to methods and systems for using multiple sweeps to map terrain with modern pencil beam weather radars.

BACKGROUND OF THE INVENTION

In recent years, avionics engineers have endeavored to improve safety of flight and reduce pilot workload. Often, it is difficult to simultaneously achieve these two desirable results. One example of this is in the area of weather radar where pilots have used weather radars to provide supplemental navigation information through terrain mapping.

Pilots have frequently used weather radars to map the terrain in front of an aircraft. They have used a manual antenna tilting technique where the tilt angle of the transmitted radar beam is adjusted in flight to provide multiple terrain strip views from the radar. The term "beam" is used herein to refer to the entire transmission area during a single azimuthal sweep of the antenna at a single tilt angle. While these pilot-controlled tilt adjustments have been used extensively in the past, they do have some drawbacks.

First of all, current generation weather radars have pencil beam antennas, which paint only a strip of ground returns at any one time, when the radars are directed downwardly so as to involve the ground. (Note: Previous generations of radars included antennas whose beam shape could be "spoiled" or modified to produce a relatively uniform illumination of the ground.) For the pilot to use a radar with a pencil beam (narrow beam) to scan the terrain at relatively short ranges in front of the aircraft, the pilot must command several different tilt values during sequential antenna scans and mentally integrate the individual radar strip-like images together. Recently, weather radars have been introduced which utilize on-board position determination equipment, such as GPS, and terrain databases to automatically control the tilt angle of the radar. However, any automatic tilt control system which uses a single pencil beam, still will only sample a strip of ground return and require the pilot to intervene to mentally integrate multiple antenna sweeps at different (albeit automatic) antenna tilt angles to produce a complete radar ground map.

Consequently, there exists a need for improved methods and systems for using modern pencil beam weather radars for detecting and displaying ground map information in an efficient manner.

SUMMARY OF THE INVENTION

It is an object of the present invention to provide a system and method which enhances safety of flight.

It is a feature of the present invention to utilize a weather radar which uses multiple sweeps to generate a single ground map display image to the pilot.

It is an advantage of the present invention to achieve improved efficiency in interpreting the significance of returns displayed on a weather radar display.

It is another advantage of the present invention to produce a complete broad coverage ground map display to the pilot even when the radar uses a modern pencil beam antenna.

The present invention is an apparatus and method for detecting and displaying ground information, which is designed to satisfy the aforementioned needs, provide the previously stated objects, include the above-listed features, and achieve the already articulated advantages. The present invention is carried out in a "one scan to one image-less" manner in a sense that the multiple scans or antenna sweeps are used to generate a single image of weather information.

Accordingly, the present invention is a system and method including a ground radar detection, processing and display apparatus which uses information from multiple scans to generate a single displayed ground information image.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
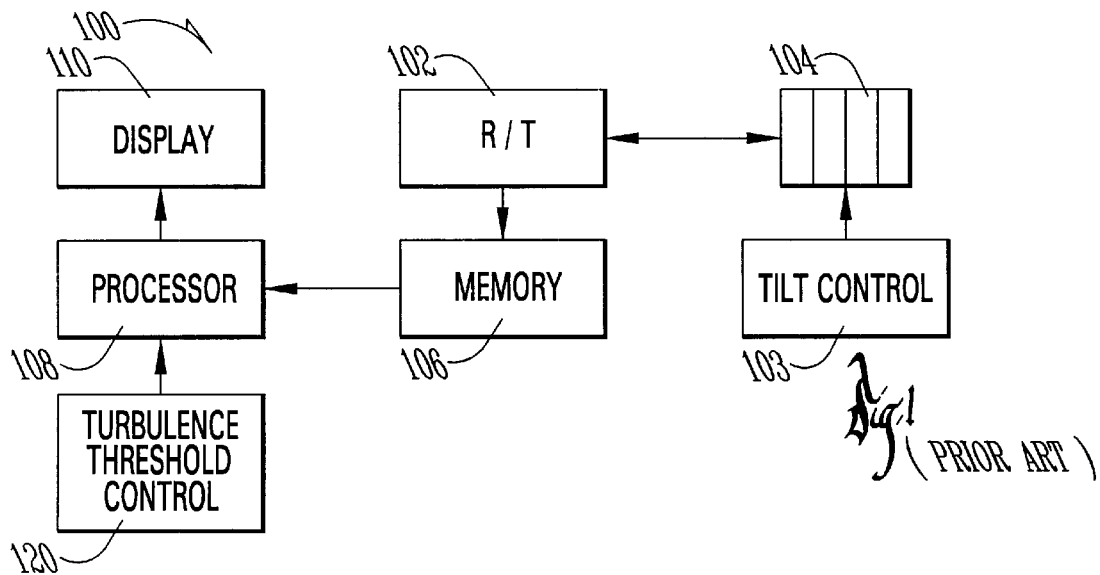
FIG. 1 is a simplified block diagram view of a weather radar system of the prior art.

Now referring to the drawings wherein like numerals refer to like matter throughout, and more specifically referring to FIG. 1, there is shown a system of the prior art, generally designated 100, including a weather radar receiver/transmitter 102 coupled to a weather radar adjustable antenna 104. A manual antenna tilt control system 103 is included for manually controlling the tilt angle of the antenna by the pilot. This system is generally used by a pilot to manually adjust the tilt angle. In some recently developed prior art systems, this tilt control is automated and is provided with information from a GPS receiver or some inertial navigation system, together with a terrain database to automatically adjust the tilt angle of the antenna so as to be pointed substantially at the terrain for ground detection. In some prior art systems, the displays have been improved with an additional single scan smoothing memory 106, which is used to store one scan and limit the display of radically different data on the next sweep. Weather radar return processing unit 108 is generally used to suppress ground clutter and perform time-based smoothing operations, as well as other well-known functions of an avionics weather radar system 100, when the system is being used and optimized for weather detection—its primary function. The degree of integration of the components 102, 103, 104, 106, 108, and 110 is a matter of designer's choice, and numerous prior art systems have many variations to those described above.

Figure 2:
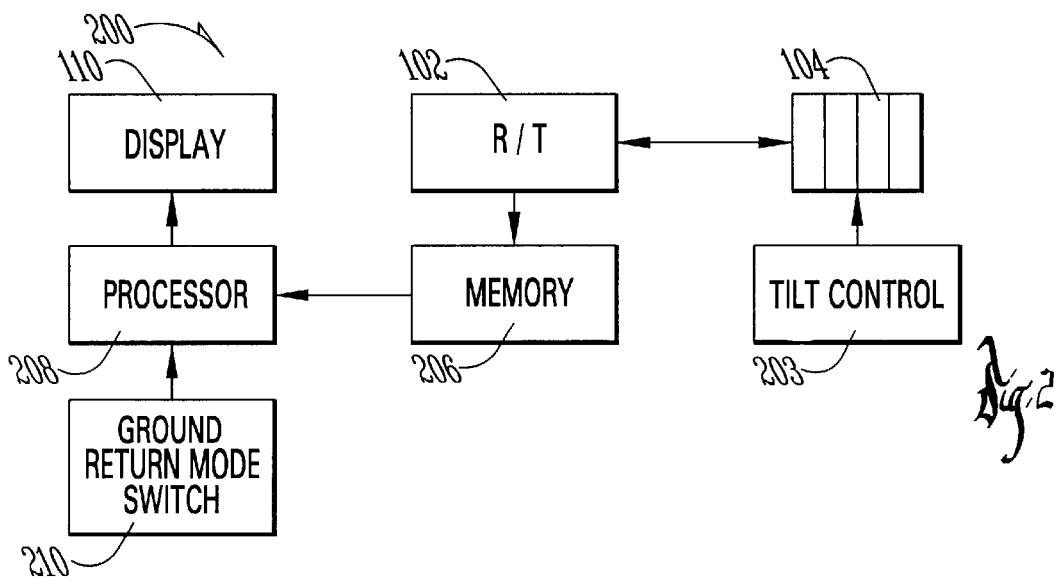
FIG. 2 is a simplified view of a block diagram view of a weather radar system of the present invention.

A detailed understanding of the present invention can be achieved by now referring to FIG. 2, which shows the avionics weather radar system of the present invention, generally designated 200, having a weather radar receiver/transmitter 102, a weather radar adjustable antenna 104 and a multi-scan, multi-tilt angle, memory 206. Also included is a tilt control 203 for automatically controlling the tilt angle of the antenna 104; this auto control may include an additional manual control feature as well. This automatic tilt control 203 must receive information from other navigation equipment, such as a GPS, inertial navigation system, altimeters, etc., so as to provide for automation of the process of directing the transmitted radar beam at an angle. This multi-scan, multi-tilt angle, memory 206 is believed to be new to the industry. Preferably, this memory is capable of storing in a readily addressable and rapidly retrievable manner, at least two, but preferably more, data sets resulting in numerous antenna sweeps at different angles.

The data in multi-scan, multi-tilt angle, memory 206 is used to achieve the beneficial properties of the present invention. The multi-scan, multi-tilt angle, weather radar return processing unit 208 will perform the customary functions performed by weather/ground mapping radar return processing unit 108, plus it will perform several additional operations based upon the additional data available in multi-scan, multi-tilt angle, memory 206. In general, multi-scan, multi-title angle, weather radar return processing unit 208 will, when in a weather mode, merge, and cross qualify portions, or ranges, of the radar returns of several different antenna sweeps at several different tilt angles, so that a single relatively clutter-free image is presented to the pilot based upon the several separate scans. Whether in weather mode or ground mapping mode, this dual mode radar system, the multi-scan, multi-tilt angle, weather radar return processing unit 208 will need to rotate and translate stored images to assure proper alignment during the merging process. This rotation and translation can be done with the aid of an on-board inertial reference system, such as a gyro, airspeed indicator, altimeters, GPS, accelerometers, etc. For ground detection, the processor will similarly merge multiple antenna scans from different antenna sweeps to produce a complete ground image. The merging and cross-qualification process can be tailored for each type of system being designed. The merging process for ground imaging may also replace portions of the newly sampled data with older stored ground return data from previous antenna scans. However, in general, the merging process would typically be implemented by a software program or hardware configuration which effectively utilizes the following rule or assumptions to process radar return data: when in the ground mapping mode, returns which do not dramatically change in strength as tilt angle is changed are assumed to be ground targets and are NOT filtered out of the display as would be typically done if in a weather mode with clutter suppression being activated. The merging process may normalize ground returns to produce estimates of radar reflectivity without the weighting effects of antenna gain versus angle effects normally seen in ground mapping systems.

The dual mode nature of the present invention is accomplished through a ground return mode switch 210, which selectively enables and disables ground clutter suppression techniques, as well as weather return suppression techniques. The two modes are essentially 1) normal or weather mode; and 2) an innovative mode referred to as terrain mapping, terrain, ground return, or ground imaging mode. Data for the ground mapping function may or may not be taken from the same radar data scans as the weather function. When common data is used, both weather and mapping data may be read out at the same time without rescanning the weather environment.

An even more detailed understanding of the present invention may be achieved by now referring to the above cross-referenced patent applications, which depict several weather radar innovations. The present innovation can be a variation of each of them except that if ground clutter suppression is used or is a goal of the innovation, then it would need to be disabled during terrain mapping. This could be as simple as having a simple mode switch on the control head of the weather radar such that a pilot can select weather or terrain mapping. Essentially, this selection would be an on/off switch for ground clutter suppression functions. In an alternate embodiment, the terrain mapping mode could employ weather return suppression techniques so as to provide a more clearly identifiable terrain map. The techniques for weather return suppression could be variations of the techniques used in the prior art and in the above cross-referenced innovations for ground clutter suppression, except that the data that is displayed in these weather return displays will be the data that is excluded from the ground return displays. Predetermined portions of multiple returns are merged to arrive at a complete display of ground returns while in the ground detection mode. Rotation and translation will be required for the ground map displays.

A person having ordinary skill in the art, with knowledge of prior art ground clutter suppression techniques and who has knowledge of prior art weather radar systems and who has no other knowledge of non-prior art systems, except that which is described in this application and in the above cross-referenced applications, could readily and with undue experimentation produce hardware and software to accomplish the tasks of merging radar returns, rotating, translating, and processing radar returns so as to selectively enable and disable display of ground returns and to otherwise make and use the systems claimed herein, as well as perform the methods claimed herein.

Throughout this description, reference is made to pencil beam weather radar and to pilots, because it is believed that the beneficial aspects of the present invention would be most readily apparent when used by pilots in connection with modern pencil beam weather radars; however, it should be understood that the present invention is not intended to be so limited and should be hereby construed to include other non-pencil beam radars, as well as radars used by persons other than pilots.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A method of mapping terrain and displaying terrain information to a pilot of an aircraft comprising the steps of:

sweeping an antenna, on said aircraft, to generate a first pencil beam radar beam at a predetermined first tilt angle which causes said first pencil beam radar beam to become involved with terrain targets and collecting and storing a first set of radar returns resulting from said first pencil beam radar beam;

automatically changing a tilt angle of said antenna to a second tilt angle, without requiring a pilot to make a manual tilt angle adjustment;

sweeping the antenna to generate a second pencil beam radar beam at said second tilt angle, which causes said second pencil beam radar beam to become involved with terrain targets and collecting and storing a second set of radar returns resulting from said second pencil beam radar beam;

merging said first set of radar returns and said second set of radar returns and making a composite image, where the composite image has identifiable ground returns therein; and, displaying said composite image to a pilot.

2. A method of claim 1 wherein said step of merging said first set of radar returns and said second set of radar returns further comprises the steps of:

translating said second set of radar returns, in accordance with input signals, so as to align said first and said second sets of radar returns.

3. A method of claim 2 wherein said step of merging said first set of radar returns and said second set of radar returns further comprises the steps of:

rotating said second set of radar returns, in accordance with input signals, so as to align said first and said second sets of radar returns.

4. A method of claim 3 wherein said step of displaying is done on a weather radar display.

5. A method of claim 3 wherein said step of rotating is done in accordance with inertial navigation signals which are representative of attitudinal and positional changes in the aircraft which occurred between collecting of said first set of radar returns and said second set of radar returns.

6. A method of claim 2 further comprising:

processing said first set of radar returns and said second set of radar returns and making a determination that portions thereof are attributable to returns from terrain targets and refraining from removing known ground returns from a display of said composite image.

7. A method of claim 6 further comprising:

processing said first set of radar returns and said second set of radar returns and making a determination that portions thereof are attributable to returns from weather targets and removing known weather returns from a display of said composite image.

8. A method of claim 6 further comprising the step of:

switching from a terrain mode of operation in which ground returns are retained to a weather mode of operation where ground returns are suppressed and removed from said composite image.

9. A method of claim 1 further comprising:

sweeping the antenna to generate a third pencil beam radar beam at a third tilt angle, which causes a third pencil beam radar beam to become involved with terrain targets and collecting and storing a third set of radar returns resulting from said third pencil beam radar beam.

10. A method of claim 9 further comprising the steps of:

merging said first, said second and said third sets of radar returns making a composite image, where the composite image has identifiable ground returns therein.

11. An apparatus for displaying terrain information comprising:

a transmitter for generating electromagnetic radiation at predetermined frequencies;

an antenna for projecting said radiation into a radar beam in a predetermined manner toward terrain targets;

means for controlling directional characteristics of said antenna;

a receiver for receiving terrain returns of radiation reflected from said terrain targets;

a processor for processing said terrain returns and generating terrain display signals;

mode switch means for selectively enabling and disabling, by pilot intervention, ground return suppression techniques, so as to cause said display signals to selectively include and exclude radar returns which are returns from terrain targets;

a display for displaying said terrain display signal generated by said a receiver;

said terrain display signals representative of terrain returns from multiple scans of said antenna, wherein said scans have a plurality of antenna tilt angles with respect to an earth reference.

12. An apparatus of claim 11 wherein said means for controlling directional characteristics of said antenna is an electronically steered antenna control.

13. An apparatus of claim 12 wherein said electronically steered antenna control includes a motor.

14. An apparatus of claim 12 wherein said electronically steered antenna control includes control of a phased array antenna.

15. An apparatus of claim 12 wherein said mode switch means further includes means of switching on and off techniques for suppressing weather returns from said terrain display signal.

16. An apparatus of claim 15 wherein said mode switch means simultaneously switches on techniques for suppressing weather returns and switches off techniques for suppressing ground clufter.

17. An apparatus of claim 11 wherein said transmitter is a weather radar transmitter.

18. A method of mapping terrain and displaying terrain information to a pilot of an aircraft comprising the steps of:

sweeping an antenna, on said aircraft, to generate a first pencil beam radar beam at a predetermined tilt angle, which causes said first pencil beam to become involved with terrain targets and collecting and storing a first set of radar returns resulting from said first pencil beam radar beam;

translating said antenna along a flight path;

continuing to sweep said antenna on said aircraft to generate a second pencil beam radar beam at a said tilt angle, which causes said second pencil beam to become involved with terrain targets, and collecting and storing a second set of radar returns resulting from said second pencil beam radar beam;

said first set of radar returns and set second set of radar returns map different terrain targets depending upon a speed characteristic of said aircraft along said flight path;

merging said first set of radar returns and said second set of radar returns and making a composite image, where the composite image has identifiable ground returns therein; and, displaying said composite image to a pilot.

19. A method of claim 18 wherein said step of merging said first set of radar returns and said second set of radar returns further comprises the steps of:

translating said second set of radar returns, in accordance with input signals, so as to align said first and said second sets of radar returns.

20. A method of claim 19 wherein said step of merging said first set of radar returns and said second set of radar returns further comprises the steps of:

rotating said second set of radar returns, in accordance with input signals, so as to align said first and said second sets of radar returns.

21. A method of claim 20 wherein said step of displaying is done on a weather radar display.

22. A method of claim 20 wherein said step of rotating is done in accordance with inertial navigation signals which are representative of attitudinal and positional changes in the aircraft which occurred between collecting of said first set of radar returns and said second set of radar returns.

23. A method of claim 19 further comprising:

processing said first set of radar returns and said second set of radar returns and making a determination that portions thereof are attributable to returns from terrain targets and refraining from removing known ground returns from a display of said composite image.

24. A method of claim 23 further comprising:

processing said first set of radar returns and said second set of radar returns and making a determination that portions thereof are attributable to returns from weather targets and removing known weather returns from a display of said composite image.

25. A method of claim 23 further comprising the step of:

switching from a terrain mode of operation in which ground returns are retained to a weather mode of operation where ground returns are suppressed and removed from said composite image.

* * * * *